United States Patent
Kim et al.

(10) Patent No.: US 8,428,640 B2
(45) Date of Patent: Apr. 23, 2013

(54) APPARATUS AND METHOD FOR ALLOCATING DOWNLINK CONTROL CHANNEL

(75) Inventors: Jeongki Kim, Gyeonggi-Do (KR);
Sunam Kim, Gyeonggi-Do (KR);
Jinsam Kwak, Gyeonggi-Do (KR);
Youngsoo Yuk, Gyeonggi-Do (KR);
Jinsoo Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 12/829,615

(22) Filed: Jul. 2, 2010

(65) Prior Publication Data
US 2011/0003553 A1    Jan. 6, 2011

Related U.S. Application Data

(60) Provisional application No. 61/222,938, filed on Jul. 3, 2009.

(51) Int. Cl.
*H04B 7/00* (2006.01)
(52) U.S. Cl.
USPC ........... 455/522; 455/450; 455/451; 455/454; 455/453; 455/455; 370/318; 370/319; 370/320

(58) Field of Classification Search .......... 455/450–455, 455/522, 69–70; 370/318–32, 318–320
See application file for complete search history.

(56) References Cited

U.S. PATENT DOCUMENTS

2009/0061778 A1 *   3/2009   Vrzic et al. .................. 455/62
2011/0003598 A1 *   1/2011   Ma et al. .................. 455/452.1

* cited by examiner

*Primary Examiner* — Fayyaz Alam
(74) *Attorney, Agent, or Firm* — Birch, Stewart, Kolasch & Birch, LLP

(57) ABSTRACT

A method for allocating a downlink control channel in a fractional frequency reuse (FFR) system, includes: dividing a service frequency band of the system into a plurality of frequency partitions including a first frequency partition corresponding to a first frequency reuse factor, a second frequency partition corresponding to Kth frequency reuse factor, and a third frequency partition; setting a transmission power level for each of the plurality of divided frequency partitions; allocating a downlink common control channel including non-user specific (NUS) control information common to every user to a particular frequency partition corresponding to the highest transmission power level among the set transmission power levels; and transmitting the NUS control information through the particular frequency partition.

18 Claims, 10 Drawing Sheets

FIG.4

| A-MAP | A-MAP | A-MAP | A-MAP | | | | |
|---|---|---|---|---|---|---|---|
| DL SF 0 | DL SF 1 | DL SF 2 | DL SF 3 | UL SF 4 | UL SF 5 | UL SF 6 | UL SF 7 |

# APPARATUS AND METHOD FOR ALLOCATING DOWNLINK CONTROL CHANNEL

CROSS-REFERENCE

The present application claims priority benefit to the following applications, which contents are all incorporated by reference herein: U.S. Provisional Application No. 61/222,938 filed on Jul. 3, 2009.

BACKGROUND OF THE INVENTION

1. Field of the Invention

The present invention relates to a structure of a downlink control channel and method for allocating a downlink control channel in a broadband wireless access system and, more particularly, to a method and apparatus for allocating a downlink control channel in a system using a fractional frequency reuse (FFR).

2. Description of the Related Art

Currently, the explosive increase in demand for radiowave resources, as well as the advancement of a communication environment, accelerates the exhaustion of available frequency resources in a frequency band lower than 3 GHz.

In an effort to overcome the exhaustion of frequency resources, a frequency reuse technology has been proposed.

In a communication system, a frequency reuse refers to reusing the same frequency at a certain distance from a neighboring cell or sector while minimizing interference.

FIG. 1 illustrates a cell frequency disposition when a frequency reuse factor K is 3.

As illustrated, in the overall system using the three frequencies G1, G2, and G3, cells using the same frequency are disposed to be as far as possible, in order to minimize interference between neighboring cells that reuse the same frequency The frequency reuse factor K is a value indicating how many cells or sectors the same frequency is reused in, and as the frequency reuse rate increases, the distance between cells or sectors using the same frequency is longer, reducing interference caused by using the same frequency, which, however, accompanies degradation of efficiency in terms of resource utilization. Thus, in order to enhance efficiency of frequency resource utilization, it is preferred to use such that the frequency reuse rate is close to 1, but when the frequency reuse rate is 1, a problem arises in that interference between neighboring cells or sectors occurs in the boundary of a cell or sector.

In order to improve the problem, a fractional frequency reuse (FFR) has been introduced.

The FFR uses that, in general, a terminal located at a central area of a cell and a terminal located at a boundary area differently affected by neighboring cells. Namely, the terminal located at the central area is not distant from a base station, degradation of receive sensitivity of a signal component due to a path attenuation is low, but relatively distant from a neighboring interference base station, greatly affected by the path attenuation, resulting in a decrease in the influence of the same channel interference. Meanwhile, in case of the terminal located at the boundary area of the cell, because its serving base station and interference base station are located at a similar distance, a signal component and an interference component are received with a similar sensitivity, increasing the influence by the same channel interference. Thus, in the FFR scheme, the terminal located at the central area of the cell is allowed to have a frequency reuse rate of 1, while the terminal located at the boundary area of the cell is allowed to have a frequency reuse rate of more than 1, to guarantee a receive performance of the user terminal located at the boundary area to a degree.

FIG. 2 illustrates cell frequency disposition employing the FFR scheme.

As shown in FIG. 2, the overall frequency resources are divided into a portion FP0 where the frequency reuse rate is 1 and portions FP1, FP2 and FP3 where the frequency reuse rate is 3. FP0 is commonly used at the central area of each cell, and FP1, FP2 and FP3 are used only in one of three neighboring base stations.

In the FFR system, the overall bands may be divided into a band (common band) where the frequency reuse rate is 1 and a band where the frequency reuse rate is 3.

Meanwhile, when medium access protocol (MAP) information including control information is transmitted to a user, one MAP area exists in each subframe. In the system supporting the FFR including the frequency reuse rate of 1 and the frequency reuse rate of 3, the MAP area may be positioned at all the four frequency partitions or at a single frequency partition.

When the MAP area is allocated to all the frequency partitions, MAP information elements (IEs) positioned at the first partition include resource allocation information regarding the partition 1, and MAP IEs positioned at the second partition include resource allocation information regarding the partition 2. In this case, overhead of control channels with respect to data can be advantageously distributed to the respective channels, but because common non-user specific control information (NUSCI) must be included in every partition, overhead is generated, and particular areas (i.e., areas which are not power-boosted in a Reuse 3 area) has a weak power strength, possibly generating a decoding error in a terminal located at a cell edge. Also, a problem arises in that processing overhead of the terminal that decodes the non-user specific MAP with respect to every partition increases.

In addition, when the MAP area is allocated only to one partition among the plurality of frequency partitions, repetition of the common control information can be advantageously reduced, but causing a problem in that because the MAP area is positioned only at the one partition, control overhead of the partition where the corresponding MAP area is positioned increases.

SUMMARY OF THE INVENTION

Therefore, in order to address the above matters, the various features described herein have been conceived.

An aspect of the present invention provides a method and apparatus for positioning common control information MAP, among control information belonging to a MAP area, at an appropriate frequency partition and notifying a terminal of corresponding position in a fractional frequency reuse (FFR) system including a plurality of frequency partitions.

According to an aspect of the present invention, there is provided a method for allocating a downlink control channel in a fractional frequency reuse (FFR) system, including: dividing a service frequency band of the system into a plurality of frequency partitions including a first frequency partition corresponding to a first frequency reuse factor, a second frequency partition corresponding Kth frequency reuse factor, and a third frequency partition; setting a transmission power level for each of the plurality of divided frequency partitions; allocating a downlink common control channel including non-user specific (NUS) control information common to every user to a particular frequency partition corresponding to the highest transmission power level among the set transmission power levels; and transmitting the NUS control information through the particular frequency partition.

According to exemplary embodiments of the present invention, in the FFR system in which the frequency reuse factor 1 and 3 (or 1/3) areas coexist, the control information channel common to every user is configured as a non user specific (NUS) A-MAP and transmitted to a power boosted area of Reuse 3, thus increasing the efficiency in using resources, and because the power level is higher than that of other areas, the NUS A-MAP decoding performance of the terminal located at the cell edge can be increased.

In addition, when the position of the NUS A-MAP is fixed in the system, the base station does not need to broadcast information regarding the position of the NUS A-MAP to a terminal. In this respect, however, when the position of the NUS A-MAP is transmitted through an SFH, the base station can transmit the NUS A-MAP to a location desired by the base station, so flexibility of the transmission of A-MAP can be increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates an example of the positions of an A-MAP area in a time division duplex (TDD) system;

DETAILED DESCRIPTION OF THE INVENTION

Figure 1:
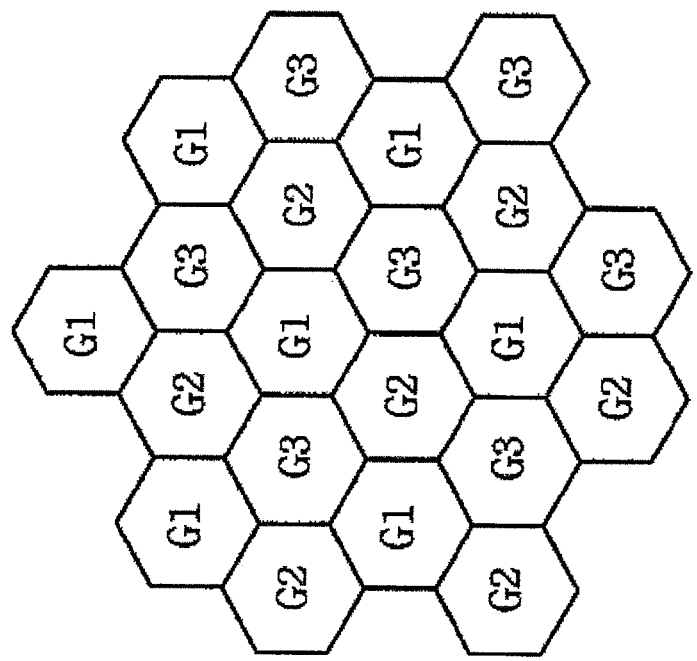
FIG. 1 is a view showing a cell frequency disposition when a frequency reuse rate K is 3.
Figure 2:
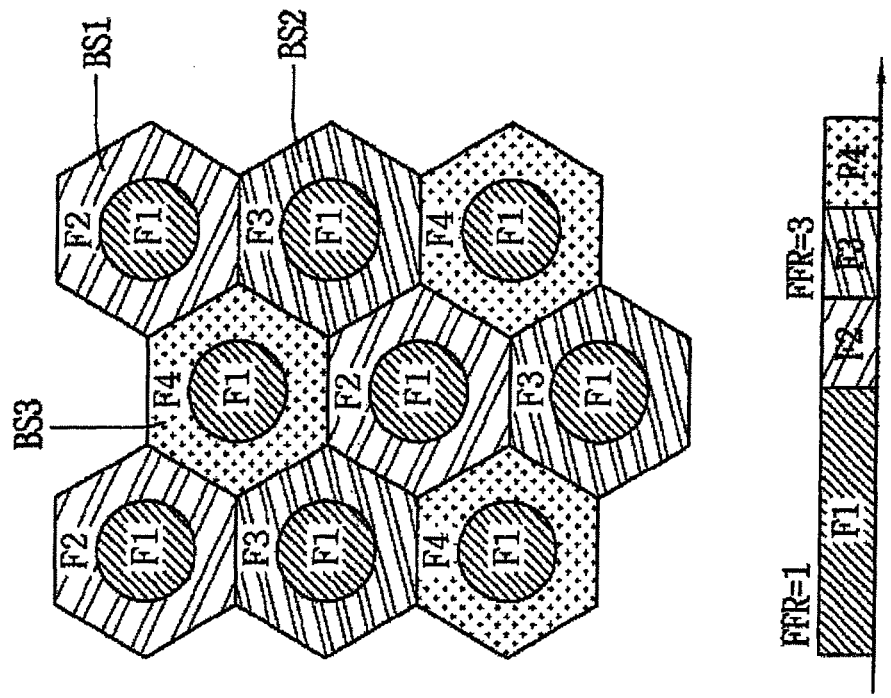
FIG. 2 is a view showing a cell frequency disposition employing a fractional frequency reuse (FFR) scheme.

Exemplary embodiments of the present invention will now be described in detail with reference to the accompanying drawings. The same reference numerals will be used throughout to designate the same or like components and a repeated description will be omitted. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components. The accompanying drawings, which are given by illustration only, and thus are not imitative of the present invention.

The terminal according to an exemplary embodiment of the present invention may also be referred to as subscriber station (SS), user equipment (UE), mobile equipment (ME), mobile station (MS), and the like. Also, the terminal may be a portable device having a communication function such as a mobile phone, a PDA, a smartphone, a notebook, and the like, or a non-portable device such as a PC or a vehicle-mounted device.

Figure 3:
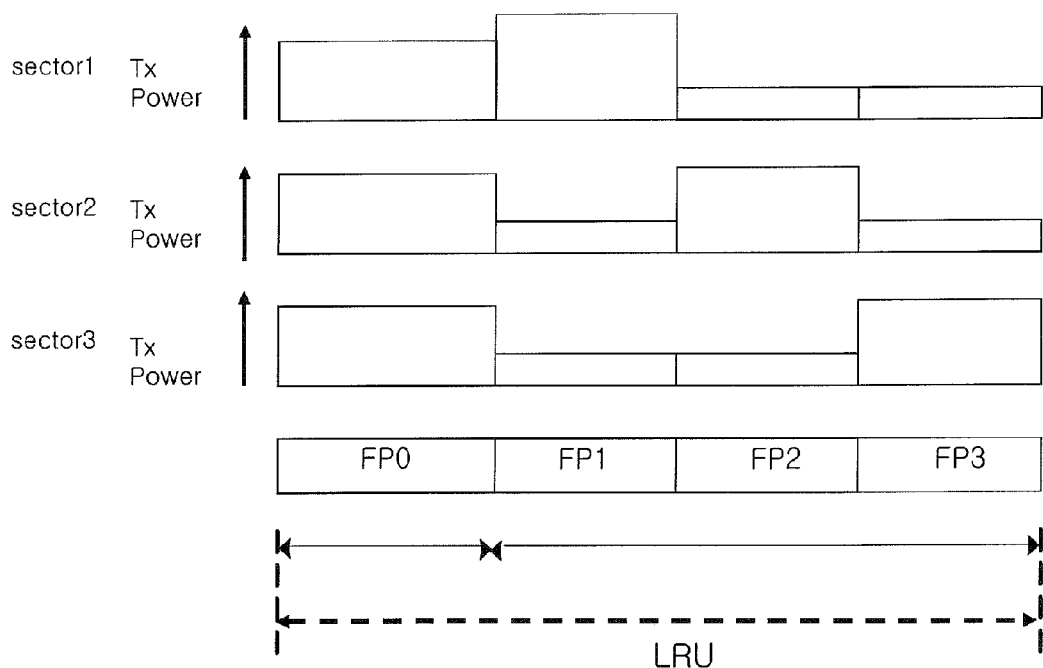
FIG. 3 illustrates a power level of each frequency partition in an FFR system including a plurality of frequency partitions according to an exemplary embodiment of the present invention.

FIG. 3 illustrates a power level of each frequency partition in an FFR system including a plurality of frequency partitions according to an exemplary embodiment of the present invention.

In an exemplary embodiment of the present invention, it is assumed that frequency reuse factors used in the FFR system are limited to 1 and 3, totaling four frequency partitions, for the sake of brevity. It is also assumed that the frequency reuse is discriminated by using a sector as a boundary. However, the frequency partitions that may be used in the FFR system are not limited to four frequency partitions and the frequency reuse unit may be determined by a cell, not a sector, as a boundary.

The boundary of the frequency partitions is adjusted by a physical resource unit (PRU), and the order of the frequency partitions is set by using logical resource unit (LRUs) indexes, starting from the lowest LRU index to the highest LRU index. The indexes of the LRUs start from a frequency reuse factor 1, and frequency partitions of the frequency reuse factor 3 are positioned next. Four frequency partitions are set in the order of a frequency partition 0 (FP0), a frequency partition 1 (FP1), a frequency partition 2 (FP2), and a frequency partition 3 (FP3). The configuration of the frequency partitions must be semi-static and may change over a very long time period Each partition may have a different power level per sector. Transmission power levels of the frequency partitions may be determined by a base station, semi-static, and change over a long time period.

The base station broadcasts essential information for configuring an FFR, namely, frequency partition configuration information such as the number of frequency partitions or the size of each partition by using a secondary super frame header information element (S-SFH IE). Terminals may report interference information to a serving base station, and the serving base station may instruct the terminals to perform an interference measurement above a radio resource region by using a solicit or unsolicit method. The result of the interference measurement of the terminal may be reported in the form of a message or a feedback channel to the base station.

In an exemplary embodiment of the present invention, a downlink control channel that transfers various control information will be described typically based on an A-MAP (Advanced MAP).

FIG. 4 illustrates an example of the positions of an A-MAP area in a TDD system in which downlink (DL) and uplink (UL) are discriminated by 4:4 subframes.

As illustrated, the A-MAP areas are all positioned in the downlink subframes, and resources of downlink data corresponding to the A-MAP area may be allocated through subframes positioned at the A-MAP areas.

All the A-MAPs share one area of a physical resource called an A-MAP region.

Figure 5:
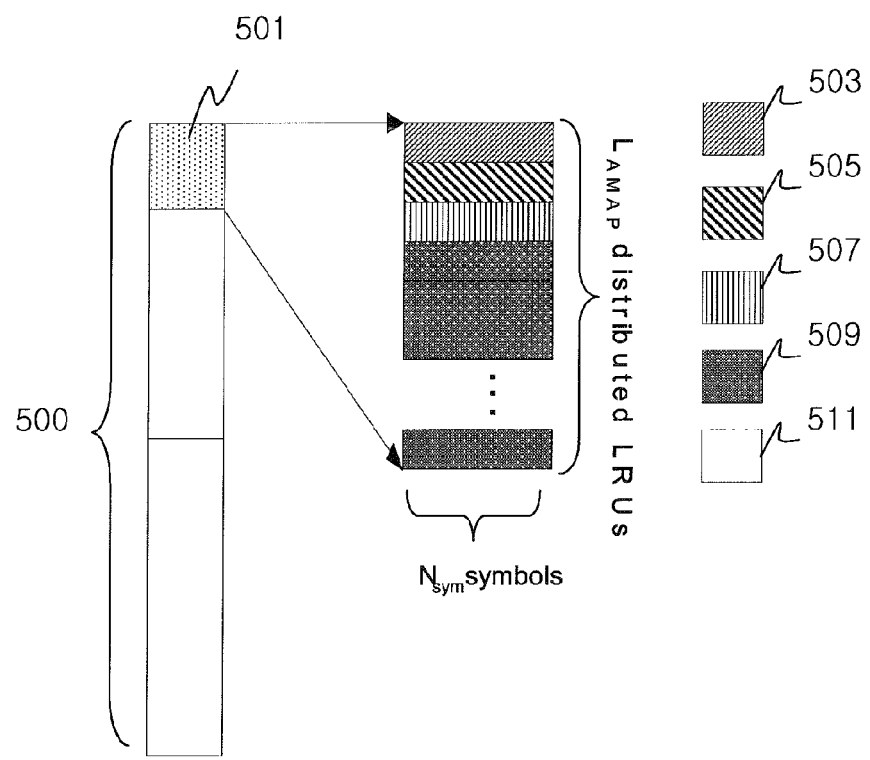
FIG. 5 illustrates the structure of the A-MAP area included in one frequency partition.

FIG. 5 illustrates the structure of the A-MAP area included in one frequency partition.

As illustrated, an A-MAP area 501 includes $L_{AMAP}$ distributed LRUs, and the LRUs include physical resource units (PRUs) composed of $N_{sym}$ symbols.

Unicast service control information including user-specific control information (USCI) specific to each user and non-user-specific control information (NUSCI) common to every user is transferred to the A-MAP 501.

The USCI includes resource allocation information, information regarding data retransmission (HARQ feedback information), power control information, and the like, and may be transmitted to assignment A-MAP 509, HARQ feedback A-MAP 505, and power control A-MAP 507 areas within the A-MAP.

Information elements (IEs) of the non-user-specific A-MAP 503 (referred to as a 'NUS A-MAP', hereinafter) includes information which is not designated for a specific user or users of a specific group, namely, information transmitted to every terminal, and include information for decoding an assignment A-MAP 509 IE. The number of assignment A-MAPs 509 of each assignment A-MAP group is designated by the information element (IE) of the NUS A-MAP 503.

The assignment A-MAP 509 includes resource allocation information classified into various types of resource allocation information elements (IEs). Each assignment A-MAP IE is separated and coded, and serves to transfer information for one user or users of one group.

In the assignment A-MAP 509, a minimum logical resource unit is called an MLRU, and the assignment A-MAP IE may be transmitted via one MLRU or several MLRUs in the A-MAP region. The number of logically continued MLRUs is determined based on the size of an assignment IE and a channel coding rate. The channel coding rate is selected based on a link condition of a channel. The assignment A-MAPs 509 may be grouped together based on a modulation and coding scheme (MCS) level and the size of the A-MAP IE. Each assignment A-MAP group includes several logically continued MLRUs, and in each assignment A-MAP group, the number of assignment A-MAPs is transferred by the NUS A-MAP 503.

As described above with reference to FIG. 5, one A-MAP region 501 exists per subframe. In the FFR system supporting both the Reuse 1 and Reuse 3 as shown in FIG. 3, the A-MAP region is positioned in all of the four frequency partitions or may be positioned in a single partition.

First, when the A-MAP region is positioned in all the partitions, the A-MAP region positioned in each partition includes information for controlling the corresponding partition. For example, the assignment A-MAP IEs positioned in the partition 1 includes information regarding resource allocation with respect to the partition 1, and the assignment A-MAP IEs positioned in the partition 2 includes information regarding resource allocation with respect to the partition 2. In this case, the overhead of the control channel with respect to data is advantageously distributed to each channel, but because the common NUS (Non-user specific) information must be inserted in every partition, overhead is generated with respect to common information. Also, as for particular areas (i.e., areas which are not power-booted in the Reuse 3 area), a decoding error may be generated in terminals located at the cell edge because strength of power is weak. Also, processing overhead of a terminal that decodes the NUS A-MAP increases in every partition. Second, when multiple frequency partitions exist, when the A-MAP region is positioned only in the partition, the repetition of common information such as NUSCI can be advantageously reduced; however, because the A-MAP region is positioned only in the single partition, control overhead of the partition where the A-MAP region is positioned increases.

Thus, the present invention proposes a method of reducing repetition of common information by positioning the NUS A-MAP, among the control information belonging to the A-MAP region, in a proper partition in the system in which the multiple frequency partitions exist.

Hereinafter, the method will be described in consideration of such an FFR system including a total of four partitions of Reuse 1 and Reuse 3 as shown in FIG. 3.

Figure 6:
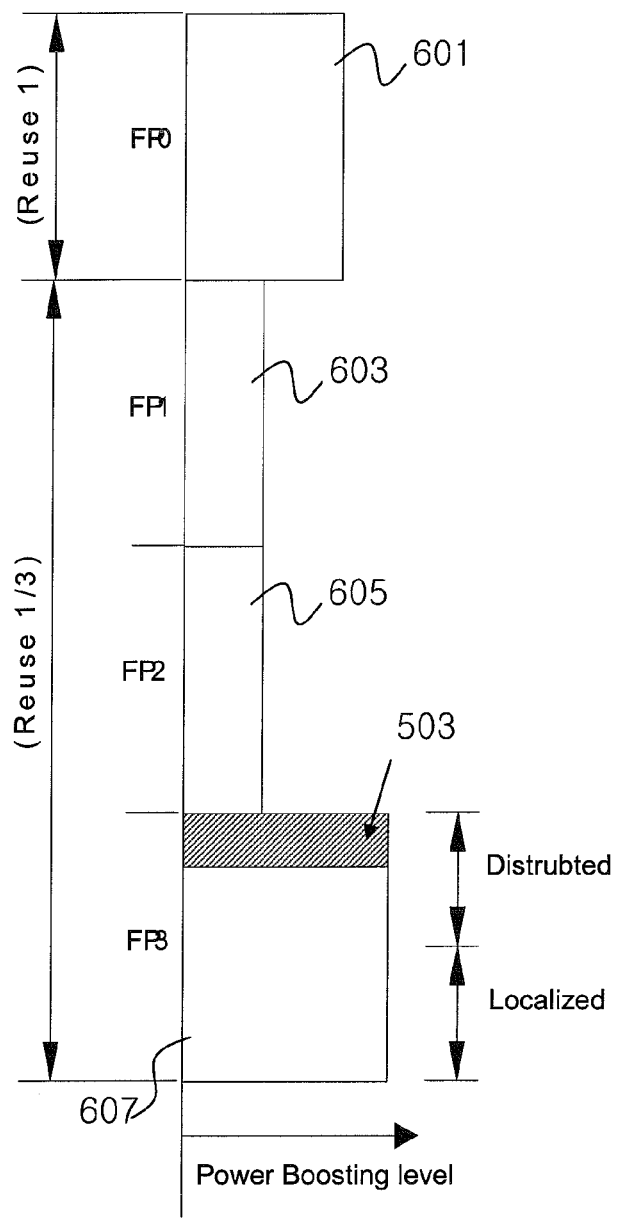
FIG. 6 is a schematic view showing allocation of an non-user specific (NUS) A-MAP in the FFR system according to an exemplary embodiment of the present invention.

FIG. 6 is a schematic view showing allocation of an non-user specific (NUS) A-MAP in the FFR system according to an exemplary embodiment of the present invention.

As shown in FIG. 6, in the FFR system in which frequency partitions of Reuse 1 and Reuse 3 exist, the NUS A-MAP 503 is positioned in an area 607 having the highest power boosting level among the frequency partitions of the Reuse 3, and transmitted to the frequency partition having the highest power boosting level. Namely, the NUS A-MAP 503 is transmitted to the frequency partition 607 power-boosted in the Reuse 3. In this case, resources for NUS A-MAP are allocated starting from an LRU having the lowest LRU index among the distributed LRUs of the corresponding area.

In the present exemplary embodiment, because the position of the NUS A-MAP is fixed in the frequency partition which is boosted with the highest power level, the base station does not need to separately inform the terminal about the position of the NUS A-MAP, and thus, a corresponding signaling procedure or message is not required. Thus, the terminal can attempt decoding of the NUS A-MAP 503 in the frequency partition 607 power-boosted in the Reuse 3 area upon receiving a plurality of frequency partitions, without having to receive additional position information regarding the NUS A-MAP from the base station.

In a different exemplary embodiment of the present invention, the position of the NUS A-MAP may be positioned in a certain frequency partition and NUS A-MAP position information may be provided to the terminal through a broadcast message such as an SFH (Super Frame Header), rather than fixing the position of the NUS A-MAP in the power-boosted frequency partition 607 of the Reuse 3 area.

Namely, the base station informs the terminals in which frequency partition the NUS A-MAP is positioned, in the form of an information element (IE) of broadcast system information (SFH, BCH, or ABI).

Preferably, a 1-bit indicator is provided to the SFH for selecting one of the frequency partition of the Reuse 1 and the power-boosted frequency partition of the Reuse 3, and one of them may be selected.

TABLE 1

| Syntax | Size (bit) | Notes |
| --- | --- | --- |
| S-SFH SP IE format ( ){ | | |
| ... | ... | ... |
| Non-user specific AMAP indicator | 1 | Indicates the position of Non-user specific A-MAP 0: Reuse 1 1: Power-boosted partition among partitions of Reuse 3 |
| ... | ... | |
| } | | |

Table 1 above shows the 1-bit indication information configured to allow the NUS A-MAP position information to be provided through the IE of the SFH. Namely, when the NUS A-MAP indicator bit information is 0, the NUS A-MAP is positioned in the frequency partition configured as the Reuse 1, and when the NUS A-MAP indicator bit information is 1, the NUS A-MAP is positioned in the frequency partition configured as the Reuse 3.

Figure 7:
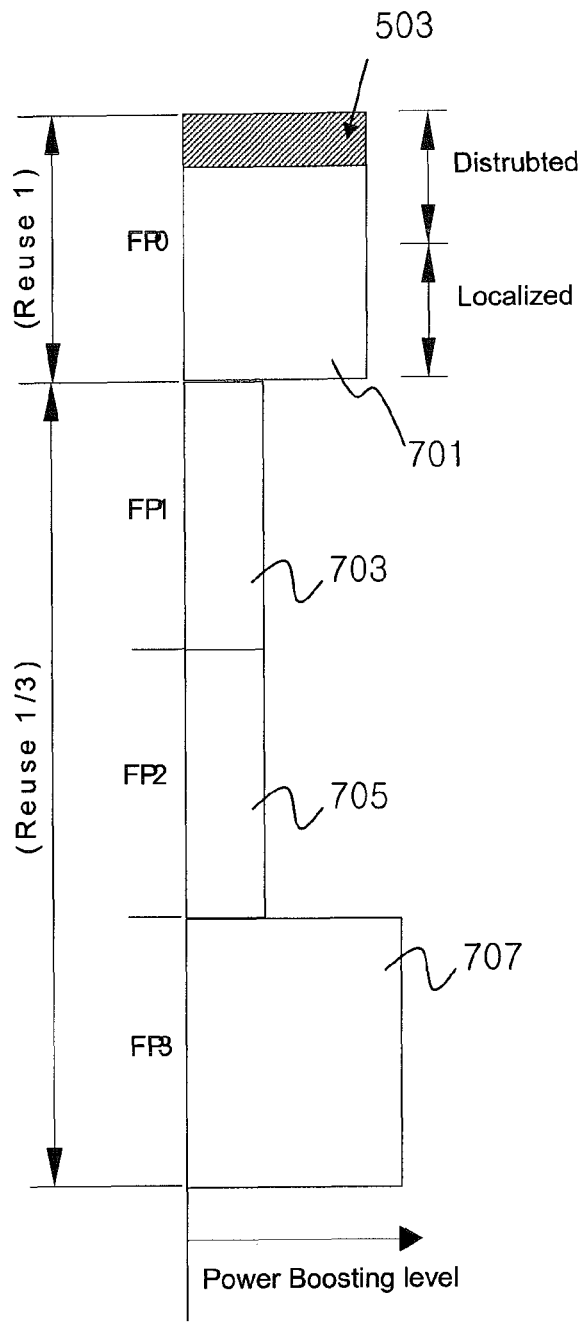
FIG. 7 is a view showing a frequency partition where the NUS A-MAP is positioned when NUS A-MAP indicator bit information is 0.

FIG. 7 is a view showing a frequency partition where the NUS A-MAP is positioned when NUS A-MAP indicator bit information is 0. As described above, when the bit information is 0, the NUS A-MAP is positioned in the frequency partition configured as the Reuse 1.

Upon receiving the SFH, the terminal recognizes in which one of the plurality of frequency partitions the NUS A-MAP is included, and performs decoding of the NUS A-MAP IE at the corresponding area. If the frequency partition is set by the SFH, resources for the NUS A-MAP are allocated, starting from the LRU having the lowest LRU index among the distributed LRUs in the set frequency partition.

In a different exemplary embodiment of the present invention, one or both of power-boosted areas of the Reuse 1 and Reuse 3 may be selected by using 2-bit bitmap.

TABLE 2

| Syntax | Size (bit) | Notes |
|---|---|---|
| S-SFH SP IE format ( ){ | | |
| ... | ... | ... |
| Non-user specific AMAP position bitmap | 2 | Indicates the position of Non-user specific A-MAP Bit#0: Reuse 1 Bit#1: Power-boosted partition among partitions of Reuse 3 |
| ... | ... | |
| } | | |

Table 2 above shows 2-bit MAP indication information configured to allow the NUS A-MAP position information to be provided through the IE of the SFH.

Namely, when bitmap information indicating the NUS A-MAP position is set to be 10, the NUS A-MAP is positioned at a power-boosted area of the frequency partition configured as the Reuse 3.

Meanwhile, when the bitmap information indicating the NUS A-MAP position is set to be 11, the NUS A-MAP is positioned at the frequency partition configured as the Reuse 1 and the power-boosted area of the frequency partition configured as the Reuse 3.

Figure 8:
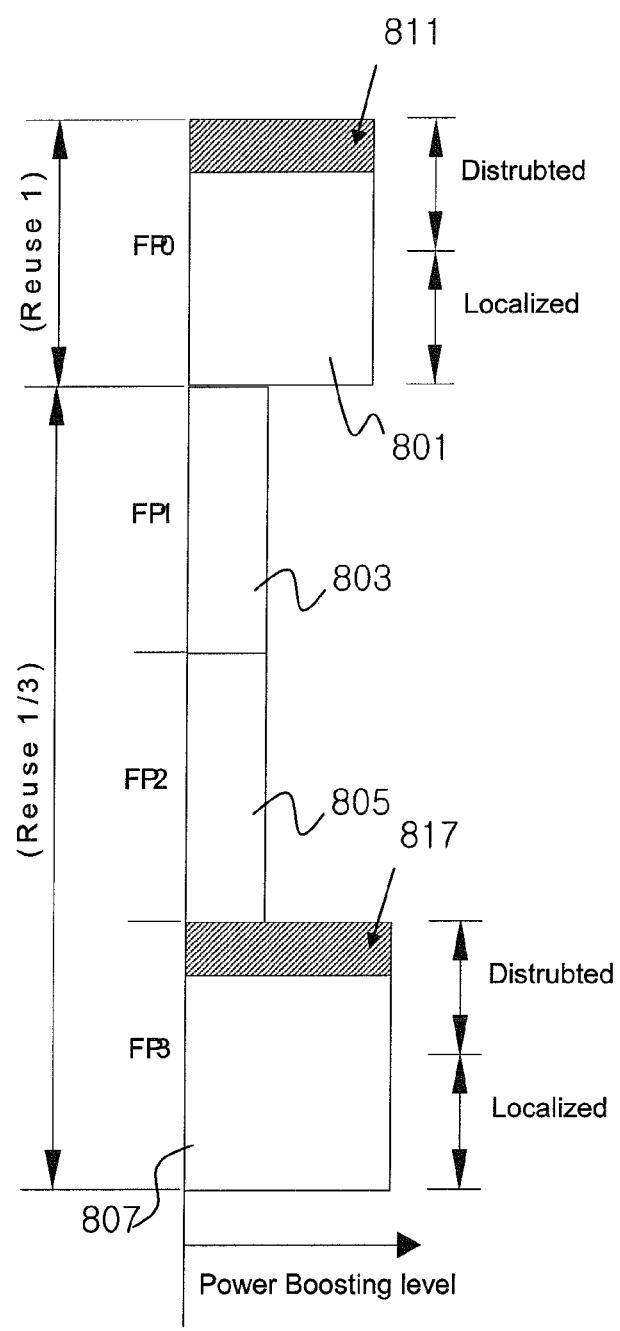
FIG. 8 is a view showing a frequency partition where the NUS A-MAP is positioned when NUS A-MAP bitmap information is 11.

FIG. 8 is a view showing a frequency partition where the NUS A-MAP is positioned when NUS A-MAP bitmap information is 11. As described above, NUS A-MAPs 811 and 817 are positioned at the frequency partition configured as the Reuse 1 (801) and the power-boosted area of the frequency partition configured as the Reuse 3 (807), respectively.

Upon receiving the SFH, the terminal recognizes in which one of the plurality of frequency partitions the NUS A-MAP is included, through the bitmap information, and performs decoding of the NUS A-MAP IE at the corresponding area. If the frequency partition is set by the SFH, resources for the NUS A-MAP are allocated, starting from the LRU having the lowest LRU index among the distributed LRUs in the set frequency partition.

So far, the method for transmitting the NUS A-MAP in the system including the Reuse 1 and the Reuse 3 (or Reuse 1/3) has been described with reference to Table 1, Table 2, and FIGS. 6 to 8.

Hereinafter, a method for transmitting the NUS A-MAP in a system including reuse M/N (M>1, M<N) will be described.

The Reuse N/M may solely exist or may exist together with the Reuse 1 or Reuse A/B (B>1, B>A).

In a first method, NUSCI information is transmitted, starting from the lowest LRU or the highest LRU among M number of areas. Preferably, the NUSCI information is transmitted to a zone of a lower logical index or physical index among power-boosted zones.

In a second method, when M number or areas successively exist, the NUSCI is transmitted, starting from the lowest LRU or the highest LRU with respect to the continued M number areas.

When the power-boosted M number of areas are separated into K number of areas, rather than being continued, the NUSCI is transmitted, starting from an LRU having the lowest LRU index of the kth (1<k<K+1) area among the separated areas, or may be transmitted, starting from an LRU having the highest LRU index of the kth (1<k<K+1) area among the separated areas. In this case, the k value is set so as not to be repeated by the respective base stations. For example, when K is 2 (namely, when there are two separated areas), the NUSCI is transmitted, starting from an LRU having the lowest LRU index or an LRU having the highest LRU index in the second power-boosted area.

In a third method, when M number of areas exist successively, the NUSCI is transmitted, starting from the lowest LRU or the highest LRU of the last area among the M number of continued areas.

If M number of areas which are not successive exist and the power-boosted M number of areas are separated into K number of areas, rather than being continued, the NUSCI is transmitted, starting from the lowest LRU of the last partition of the first area among the separated areas. For example, when K is 2 (i.e., when there are two separated areas), the NUSCI is transmitted, starting from the lowest LRU (or the highest LRU) of the last partition of the first power-boosted area.

In a fourth method, the NUSCI is allowed to exist in all of M number of power-boosted areas.

In a fifth method, the NUSCI is allowed to exist in the lowest LRU (or the highest LRU) of the highest power-boosted area among the M number of power-boosted areas.

Preferably, in the first to fifth methods, relevant information as to how the NUSCI is configured may be broadcast to the terminal by using the BCH or the like.

Figure 9:
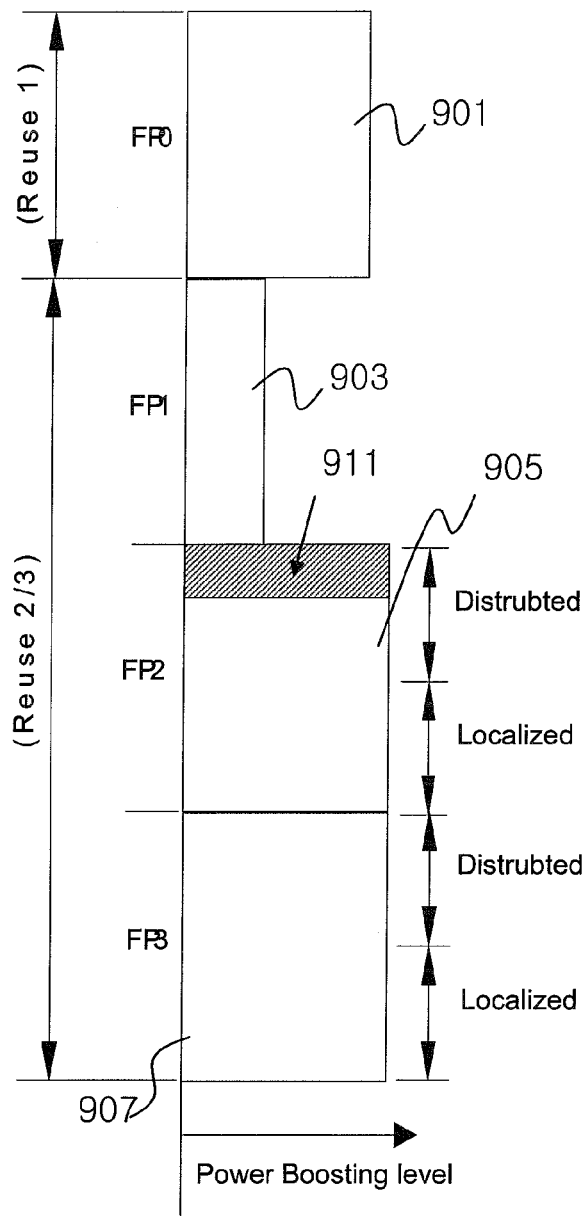
FIG. 9 is a view showing an example when the indicator is set to be 1 in case in which a super frame header (SFH) includes a 1 bit NUS A-MAP indicator as shown in Table 1 in a system including frequency partitions of Reuse 1 and Reuse 2/3.

FIG. 9 is a view showing an example when the indicator is set to be 1 in case in which a super frame header (SFH) includes a 1 bit NUS A-MAP indicator as shown in Table 1 in a system including frequency partitions of Reuse 1 (901) and Reuse 2/3 (903, 905, 907).

As illustrated, when two continued power-boosted areas 905 and 907 of the Reuse 2/3 have the same power boosting level, the NUS A-MAP 911 is allocated to a distributed LRU having the lowest index.

If the NUS A-MAP indicator is set to be 0, the NUS A-MAP is allocated, starting from the distributed LRU having the lowest index of the Reuse 1 901.

Figure 10:
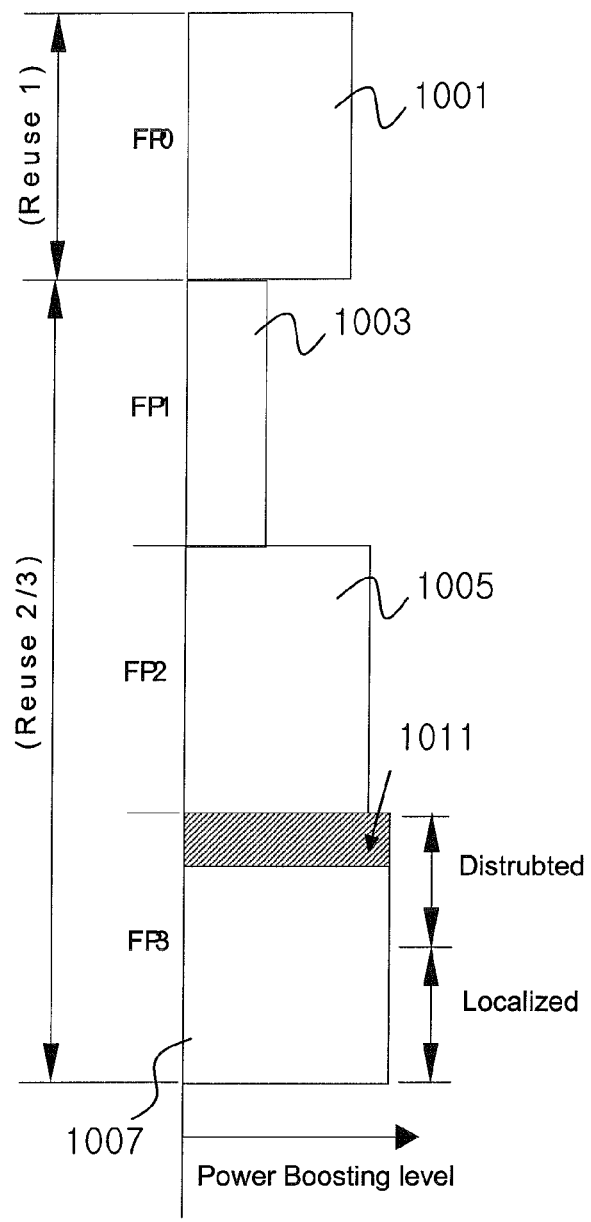
FIG. 10 is a view showing an example when the indicator is set to be 1 in case in which a super frame header (SFH) includes a 1 bit NUS A-MAP indicator as shown in Table 1 in a system including frequency partitions of Reuse 1 and Reuse 2/3.

FIG. 10 is a view showing an example when the indicator is set to be 1 in case in which a super frame header (SFH) includes a 1 bit NUS A-MAP indicator as shown in Table 1 in a system including frequency partitions of Reuse 1 (1001) and Reuse 2/3 (1003, 1005, 1007).

As illustrated, an NUS A-MAP 1011 is allocated, starting from the distributed LRU having the lowest index of a frequency partition 1007 having the highest power boosting level, among the Reuse 2/3 areas.

The methods according to the present invention described thus far can be implemented as software, hardware or their combination. For example, the method according to the present invention may be stored in a storage medium (e.g., an internal memory of a terminal, a flash memory, a hard disk, and the like), and may be implemented as codes or commands in a software program that can be executed by a processor (e.g., an internal microprocessor of a terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for transmitting downlink control information in a fractional frequency reuse (FFR) system, the method comprising:
    dividing a service frequency band of the system into a plurality of frequency partitions (FPs);
    separately setting a transmission power level for each of the plurality of FPs;
    allocating non-user-specific control information to one FP of the plurality of FPs, the non-user-specific control information being information that is not dedicated to a specific user or a specific group of users; and
    transmitting indication information to a terminal through a super frame header (SFH), the indication information indicating where the non-user-specific control information is allocated among the plurality of FPs,
    wherein when the plurality of FPs comprises a reuse 1 partition and a power-boosted reuse 3 partition:
        the reuse 1 partition is a first FP using a first frequency,
        the power-boosted reuse 3 partition is a second FP among 3 FPs using 3 frequencies different from the first frequency and has a boosted transmissions power, and
        the indication information indicates the reuse 1 partition or the power-boosted reuse 3 partition.

2. The method of claim 1, wherein the indication information comprises a bit indicator included in the super frame header (SFH).

3. The method of claim 2,
    wherein the bit indicator has one bit to indicate whether the non-user-specific control information is allocated to the reuse 1 partition or the power-boosted 3 partition, and
    wherein the power-boosted reuse 3 partition is a frequency partition (FP) having a highest transmission power level among the 3 FPs.

4. The method of claim 1,
    wherein the non-user-specific control information is Medium Access Protocol (MAP) information that is a part of Advanced Medium Access Protocol (A-MAP) information that is transmitted via a region of a corresponding frequency partition denoted as an A-MAP region, and
    wherein the A-MAP information further includes at least one of hybrid automatic repeat request (HARQ) feedback A-MAP information, power control A-MAP information, and assignment A-MAP information.

5. A device configured to transmit downlink control information in a fractional frequency reuse (FFR) system, the device comprising:
    a processor configured to
        divide a service frequency band of the system into a plurality of frequency partitions (FPs),
        separately set a transmission power level for each of the plurality of FPs,
        allocate non-user-specific control information to one FP of the plurality of FPs, the non-user-specific control information being information that is not dedicated to a specific user or a specific group of users, and
        transmit indication information to a terminal through a super frame header (SFH), the indication information indicating where the non-user-specific control information is allocated among the plurality of FPs,
    wherein when the plurality of FPs comprises a reuse 1 partition and a power-boosted reuse 3 partition:
        the reuse 1 partition is a first FP using a first frequency,
        the power-boosted reuse 3 partition is a second FP among 3 FPs using 3 frequencies different with the first frequency and has a boosted transmission power, and
        the indication information indicates the reuse 1 partition or the power-boosted reuse 3 partition.

6. The device of claim 5, wherein the indication information comprises a bit indicator included in the super frame header (SFH).

7. A device configured to receive downlink control information in a fractional frequency reuse (FFR) system, the device comprising:
    a processor configured to
        receive indication information through a super frame header (SFH), the indication information indicating where non-user-specific control information is allocated among a plurality of FPs, the non-user-specific control information being information that is not dedicated to a specific user or a specific group of users,
        wherein a transmission power level is separately set for each of the plurality of FPs, and
        wherein when the plurality of FPs comprises a reuse 1 partition and a power- boosted reuse 3 partition:
            the reuse 1 partition is a first FP using a first frequency,
            the power-boosted reuse 3 partition is a second FP among 3 FPs using 3 frequencies different with the first frequency and has a boosted transmission power, and
            the indication information indicates the reuse 1 partition or the power-boosted reuse 3 partition.

8. The device of claim 7,
    wherein the indication information comprises a bit indicator included in the super frame header (SFH).

9. The device of claim 5,
    wherein the non-user-specific control information is Medium Access Protocol (MAP) information that is a part of Advanced Medium Access Protocol (A-MAP) information that is transmitted via a region of a corresponding frequency partition denoted as an A-MAP region, and
    wherein the A-MAP information further includes at least one of hybrid automatic repeat request (HARM) feedback A-MAP information, power control A-MAP information, and assignment A-MAP information.

10. The device of claim 5, wherein the processor further configured to transmit the non-user-specific control information through the reuse 1 partition or the power-boosted reuse 3 partition based on the indication information.

11. The device of claim 6,
wherein the bit indicator has one bit to indicate whether the non-user-specific control information is allocated to the reuse 1 partition or the power-boosted reuse 3 partition, and
wherein the power-boosted reuse 3 partition is a frequency partition (FP) having a highest transmission power level among the 3 FPs.

12. The device of claim 7,
wherein the bit indicator has one bit to indicate whether the non-user-specific control information is allocated to the reuse 1 partition or the power-boosted reuse 3 partition, and
wherein the power-boosted reuse 3 partition is a frequency partition (FP) having a highest transmission power level among the 3 FPs.

13. The device of claim 8,
wherein the non-user-specific control information is Medium Access Protocol (MAP) information that is a part of Advanced Medium Access Protocol (A-MAP) information that is received via a region of a corresponding frequency partition denoted as an A-MAP region, and
wherein the A-MAP information further includes at least one of hybrid automatic repeat request (HARM) feedback A-MAP information, power control A-MAP information, and assignment A-MAP information.

14. A method for receiving downlink control information in a fractional frequency reuse (FFR) system, the method comprising:
receiving indication information through a super frame header (SFH), the indication information indicating where non-user-specific control information is allocated among a plurality of FPs, the non-user-specific control information being information that is not dedicated to a specific user or a specific group of users,
wherein a transmission power level is separately set for each of the plurality of FPs, and
wherein when the plurality of FPs comprises a reuse 1 partition and a power-boosted reuse 3 partition:
the reuse 1 partition is a first FP using a first frequency,
the power-boosted reuse 3 partition is a second FP among 3 FPs using 3 frequencies different with the first frequency and has a boosted transmission power, and
the indication information indicates the reuse 1 partition or the power-boosted reuse 3 partition.

15. The method of claim 14, further comprising:
receiving the non-user-specific control information through the reuse 1 partition or the power-boosted reuse 3 partition based on the indication information.

16. The method of claim 14, wherein the indication information comprises a bit indicator included in the super frame header (SFH).

17. The method of claim 16,
wherein the bit indicator has one bit to indicate whether the non-user-specific control information is allocated to the reuse 1 partition or the power-boosted reuse 3 partition, and
wherein the power-boosted reuse 3 partition is a frequency partition (FP) having a highest transmission power level among the 3 FPs.

18. The method of claim 14,
wherein the non-user-specific control information is Medium Access Protocol (MAP) information that is a part of Advanced Medium Access Protocol (A-MAP) information that is received via a region of a corresponding frequency partition denoted as an A-MAP region, and
wherein the A-MAP information further includes at least one of hybrid automatic repeat request (HARM) feedback A-MAP information, power control A-MAP information, and assignment A-MAP information.

* * * * *